Dec. 21, 1943.      L. GOTTSCHALK      2,337,160
GEAR ARRANGEMENT
Filed Aug. 11, 1942      2 Sheets-Sheet 2
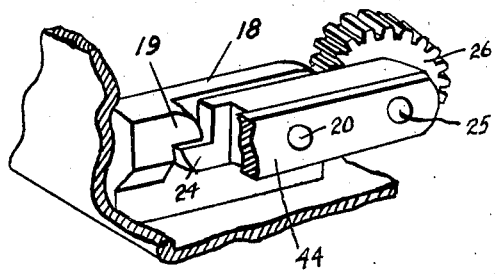
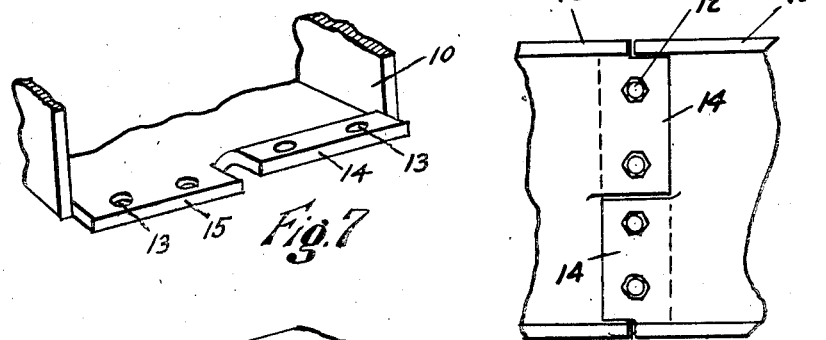
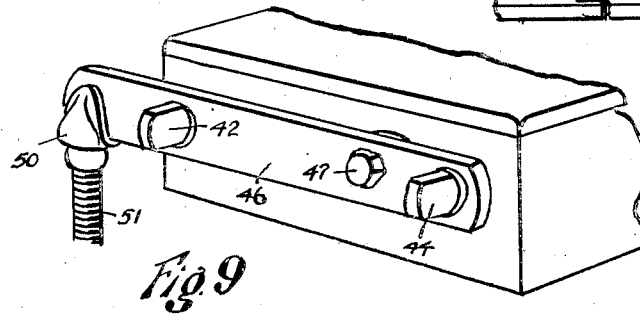
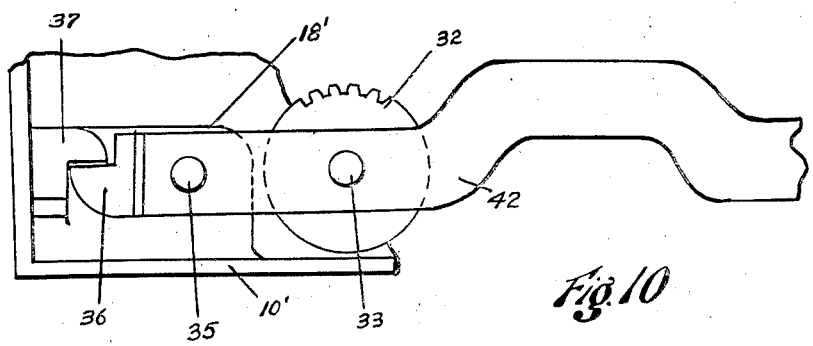
INVENTOR.
LOUIS GOTTSCHALK
BY Christian L. Nielsen
ATTORNEY.

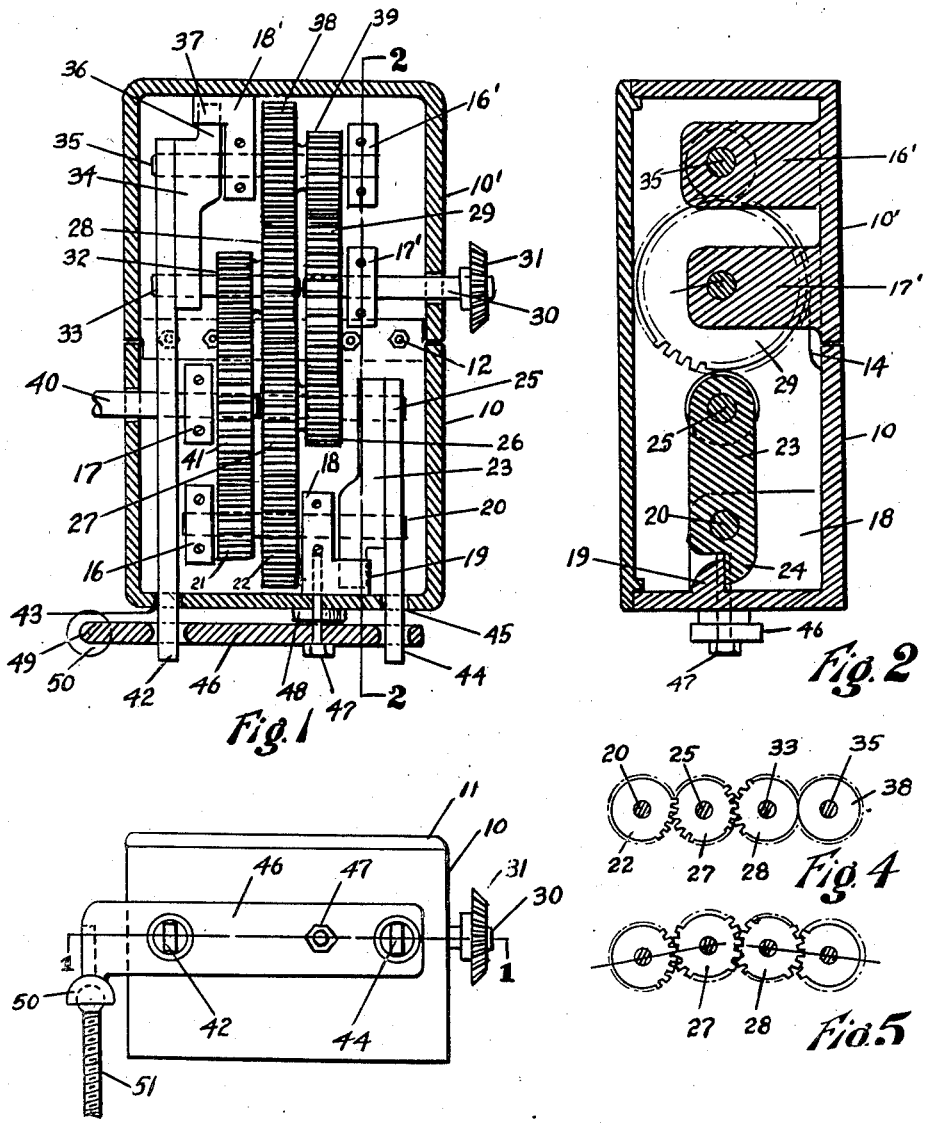
Dec. 21, 1943.  L. GOTTSCHALK  2,337,160
GEAR ARRANGEMENT
Filed Aug. 11, 1942  2 Sheets-Sheet 1
INVENTOR.
LOUIS GOTTSCHALK
BY Christian R. Nielsen
ATTORNEY.

Patented Dec. 21, 1943

2,337,160

UNITED STATES PATENT OFFICE 2,337,160

GEAR ARRANGEMENT

Louis Gottschalk, Milwaukee, Wis.

Application August 11, 1942, Serial No. 454,413

4 Claims. (Cl. 74—405)

My invention relates to gear arrangements and more particularly to an arrangement of spur gears that may be forced into mesh by means of lever action actuated by a screw jack or the like.

The object of my invention is to provide an arrangement whereby gears may be assembled into a receptacle and mounted into bearings which form a part of the receptacle.

Another object of my invention is to arrange such an assembly of gears in a manner that will permit engagement and disengagement of the gears by means of lever actions operated by a screw jack or the like.

A further object of my invention is to so construct the receptacle that it may be assembled in sections thereby assisting in the mounting and assembling of the gears and shafts.

Still another object of my invention is to mount certain shafts supporting gears in the assembly, into movable bearings that are provided with contacting means for retaining the gears in a predetermined position in their neutral engagement.

Other and further objects of my invention will become more apparent as the description proceeds when taken in conjunction with the drawings in which Figure 1 is a fragmentary cross-sectional view of the device showing the gear and shaft assembly mounted in bearings, Figure 2 is a cross-sectional view of the entire assembly taken at a line 2—2 in Figure 1, Figure 3 is a side view of the assembled device illustrating the lever arrangement and its operation by means of a jack screw, Figure 4 is a plan view of the main gear assembly in position and in mesh with one another, Figure 5 is a plan view of the same gear assembly illustrating the manner in which the gears are effected by the lever action, Figure 6 is a fragmentary perspective view of the pivoted bearing on the short lever end, Figure 7 is a partial view of the housing or enclosure arrangement illustrating the manner in which the two housing halves, which are constructed identically, may be made so that they may be bolted or attached to one another to make a complete receptacle, Figure 8 is a plan view of sections of the enclosure shown bolted together, Figure 9 is a perspective view of one end of the enclosure illustrating the manner in which the lever arrangement is pivotally attached, and Figure 10 is a side view of the long lever arrangement illustrating one of the many ways of forming the lever to prevent its interference with the drive shaft.

Similar characters of reference indicate corresponding parts throughout the several views and referring now to the same, the character 10 shows a housing or enclosure in sections consisting of a horizontal base and vertical walls. There is a cover 11 which may be constructed to fit over the entire enclosure in any convenient and efficient manner.

The two halves of the enclosure 10 and 10' respectively are bolted together by means of bolts 12 through apertures 13 to the flanges 14 and 15. The flange 14 in Figure 7 consists of one-half the edge of the enclosure section and is shown raised to a height corresponding with the thickness of the flange 15 which is of a length equal to the other half of the enclosure and is disposed straight outward from the bottom of the enclosure 10.

There are bearings shown as 16, 17 and 18, and 16', 17' and 18' respectively, extending upward from the bottom of the enclosure, the bearings 18 and 18' being additionally supported by the vertical wall of the enclosure and provided with an outwardly extending member 19.

The shaft 20, journaled in bearings 16 and 18, supports an integral pair of gears consisting of a pinion 21 and a main gear 22. These two gears are integrally constructed or may be keyed or otherwise attached to the shaft 20 to form an integral unit. A part of the shaft 20 extends outward from the bearing 18 and supports a pivoted member 23 provided with an extending member 24 which engages the extending member 19 on the bearing 18 as shown in Figure 2. The pivoted member 23 extends outward from the shaft 20 where it is pivotally supported and its depending end journals a short shaft 25 which is rigidly fastened into the member 23 and supports the integrally constructed pinion 26 and main gear 27. The gear 27 engages a similar gear 28 mounted on shaft 33 and the pinion 26 engages an auxiliary gear 29 which is keyed to a shaft 30 journaled in the bearing 17' and extending outwardly through the wall of the enclosure 10' and having a beveled gear 31 keyed to its extreme end. This gear 31 may be replaced by a sprocket, pulley, or any other means of power transmission.

A pinion 32 forms an integral part of the gear 28 and both the pinion 32 and gear 28 are rotatably mounted on a short shaft 33, rigidly supported on one end by a pivoted member 34 which is constructed identical with the member 23 and is pivotally mounted on a shaft 35 extending through and journaled in the bearings 18' and 16' as shown. The member 34 is also provided with an extending member 36 same as the member 24 and engages an outwardly extending member 37 on the bearing 18' corresponding with the number 19 on the bearing 18. The shaft 35 supports a main gear 38 and a pinion 39 which are also integrally constructed and mesh with the gears 28 and 29 respectively.

There is also a driven shaft 40 shown projecting through the wall of the enclosure. This shaft is journaled in the bearings 17 and supports another auxiliary gear 41. By referring to the illustration shown in Figure 1, it will be noted that the four gears, 22, 27, 28 and 38, are of equal size and all engage one another while the two auxiliary gears, 29 and 41, engage the pinions 39 and 26 in one instance and 21 and 32 in another instance respectively. Obviously the face of these gears and pinions is the same diameter, as are the pitch of the teeth. But the number of teeth on the main gears, 22, 27, 28 and 38, is twice that of the number of teeth on the pinions 26, 39, 21 and 32. While the two auxiliary gears 29 and 41 have three times the number of teeth than have the pinions. In this way, all spur gears and pinions will be synchronized and the speed of the drive shaft 39 will be identical with the speed of the driven shaft 40 but in an opposite direction.

A lever 42 extending from and fastened to the pivoted member 34 extends out of the wall of the enclosure at 43 while a lever 44 extending from and fastened to the pivoted member 24 extends out of the wall of the enclosure at 45. There is a long lever 46 pivotally mounted at 47 by means of a bolt into the bearing 18. This lever is shown spaced away from the outer face of the enclosure 10 by means of a spacer washer 48. Both levers 42 and 44 engage and extend through the long lever 46 on opposite sides of the pivoted mounting 47 and the end 49 of the long lever 46 is provided with a socket 50 shown in engagement with a jack screw 51. Obviously any means may be employed to raise the end 49 of the lever 46, and by so doing it will raise the end of the lever 42 and lower the end of the lever 44 forcing the two gears 27 and 28 into an engaged position as shown in Figure 4. The contact of the members 19 and 24 as well as 36 and 37 will keep the gears from dropping when the screw jack is not applied.

It is manifest to anyone familiar with the art that this arrangement of gears enclosed in the receptacle as shown may be placed anywhere within a power transmission such as automobiles or the like and the screw jack may be operated from the dash of the automobile if desired; however, the unit is not limited to automobiles but may be placed anywhere where a positive drive is required.

While I have shown and described herein a particular and specific construction, I do not desire to limit myself to the arrangement shown but reserve the right to make such changes as are deemed desirable without departing from the invention or the scope of the appended claims.

Having thus described my invention what I claim and desire to secure by Letters Patent in the United States is:

1. A device of the character described, comprising in combination, an enclosure, a plurality of stationary bearings within said enclosure, a drive shaft journalled within one of said bearings, a driven shaft journalled in another of said bearings, a gear keyed to each one of said drive and driven shaft, a pair of stationary shafts, each of said stationary shafts mounted in a pair of said stationary bearings, a pair of dual gears, each one of said dual gears, consisting of a gear and pinion, said dual gears attached to one another, and rotatably mounted on said stationary shafts, the pinions of the gears on said stationary shafts being in alignment with the gears on said drive and driven shaft, a pair of pivoted bearings, said pivoted bearings mounted onto said stationary shafts, the outwardly extending ends of said pivoted bearings having auxiliary shafts mounted therein, a pair of dual auxiliary gears consisting of a gear and pinion attached to one another, said auxiliary dual gear rotatably mounted on said auxiliary shafts, the gear member of said auxiliary dual gears in direct alignment with the gears on said stationary shafts, and the pinion members of said auxiliary dual gears in direct alignment with the gears on said drive and driven shafts, and lever means attached to said pivoted bearings to permit the dual auxiliary gears to be lifted in and out of engagement with gears on said stationary shaft and with one another.

2. A device as described in claim 1, in which the lever arrangement is operated by means of a screw jack for forcing rigid engagement of said gears.

3. A device of the character described comprising in combination, a sectional enclosure, a plurality of bearings integrally mounted within said enclosure, a drive shaft journalled in one of said bearings, a driven shaft journalled in another one of said bearings, both the drive shaft and driven shaft extending outward through opposite walls of said enclosure, a gear keyed to each one of said drive and driven shafts, a pair of stationary shafts, each of said stationary shafts mounted in a pair of said stationary bearings, a pair of dual gears, each one of said dual gears, consisting of a gear and pinion, said dual gears attached to one another, and mounted on said stationary shafts, the pinions of the gears on said stationary shafts being in alignment with the gears on said drive and driven shaft, a pair of pivoted bearings, said pivoted bearings mounted onto said stationary shafts, the outwardly extending ends of said pivoted bearings having auxiliary shafts mounted therein, a pair of dual auxiliary gears consisting of a gear and pinion attached to one another, said auxiliary dual gear rotatably mounted on said auxiliary shafts, the gear member of said auxiliary dual gears in direct alignment with the gears on said stationary shafts, and the pinion members of said auxiliary dual gears in direct alignment with the gears on said drive and driven shafts, levers attached to said pivoted bearings, said levers extending outward through one of the walls of said enclosure, a link lever, said link lever pivoted to the walls of said enclosure, said link lever employed to actuate said bearing levers, thereby permitting the dual auxiliary gears to be engaged and disengaged with the gears on said stationary shaft and with one another.

4. A device as described in claim 3, in which the sections of the enclosure is provided with means for assembling them into one unit.

LOUIS GOTTSCHALK.